US008785071B2

(12) United States Patent
Falta et al.

(10) Patent No.: US 8,785,071 B2
(45) Date of Patent: Jul. 22, 2014

(54) FUEL CELL OPERATION WITH A FAILED OPEN INJECTOR

(75) Inventors: Steven R. Falta, Honeoye Falls, NY (US); Rainer Pechtold, Hunstetten (DE); Daniel C. Di Fiore, Scottsburg, NY (US); Donald H. Keskula, Fairport, NY (US); Matthew A. Lang, Churchville, NY (US); Michael Leykauf, Darmstadt (DE); Joseph N. Lovria, Honeoye Falls, NY (US); Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 13/288,482

(22) Filed: Nov. 3, 2011

(65) Prior Publication Data

US 2013/0115540 A1    May 9, 2013

(51) Int. Cl.
*H01M 8/04* (2006.01)
*H01M 8/06* (2006.01)
*H01M 8/00* (2006.01)

(52) U.S. Cl.
USPC .......... 429/444; 429/408; 429/428; 429/443; 429/535

(58) Field of Classification Search
USPC .................. 429/444, 408, 428, 443
See application file for complete search history.

(56) References Cited

U.S. PATENT DOCUMENTS

| 2008/0138689 | A1* | 6/2008 | Leo et al. ................ 429/34 |
| 2008/0206607 | A1* | 8/2008 | Mallavarapu et al. ....... 429/13 |
| 2009/0081492 | A1* | 3/2009 | Hasuka et al. ............ 429/13 |
| 2009/0253008 | A1* | 10/2009 | Ishikawa ................ 429/22 |
| 2010/0233581 | A1* | 9/2010 | Katano et al. ............ 429/513 |

\* cited by examiner

*Primary Examiner* — Muhammad Siddiquee
(74) *Attorney, Agent, or Firm* — John A. Miller; Miller IP Group, PLC

(57) ABSTRACT

A system and method for controlling hydrogen gas flow to an anode side of a fuel cell stack using a pressure regulator in the event that an injector that normally injects the hydrogen gas into the fuel cell stack has failed in a stuck open position. During normal operation, the control of the injector is determined based on the pressure of an anode sub-system and the position of the pressure regulator is determined based on a supply pressure between the pressure regulator and the injector. If it is determined that the injector is stuck in an open position, then the position of the pressure regulator is controlled to the anode pressure instead of the supply pressure. If the pressure regulator is an electrical pressure regulator, then it is pulsed to mimic normal system operation. Alternately, another valve, such as a shut-off valve, can be employed to provide the flow pulsing.

14 Claims, 1 Drawing Sheet

FUEL CELL OPERATION WITH A FAILED OPEN INJECTOR

BACKGROUND OF THE INVENTION

1. Field of the Invention

This invention relates generally to a system and method for controlling the flow of an anode gas to a fuel cell stack in response to an injector that has failed in a stuck open position and, more particularly, to a system and method for controlling the flow of an anode gas to a fuel cell stack in response to an injector that has failed in a stuck open position, where the system uses a pressure regulator that is controlled to an anode sub-system pressure to control the flow of the anode gas.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines. Fuel cell vehicles are expected to rapidly increase in popularity in the near future in the automotive marketplace.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Typically, hydrogen gas for the fuel cell system is stored at high pressure in a tank system including one or more interconnected pressure vessels on the vehicle to provide the hydrogen gas fuel necessary for the fuel cell stack. The pressure within the vessels can be 700 bar or more. In one known design, the pressure vessels include an inner plastic liner that provides a gas tight seal for the hydrogen gas, and an outer carbon fiber composite layer that provides the structural integrity of the vessel.

A hydrogen gas storage system typically includes at least one pressure regulator as part of the various and numerous valves, gauges, and fittings necessary for operation of the hydrogen storage system, where the pressure regulator reduces the pressure of the hydrogen gas from the high pressure in the vessels to a constant pressure suitable for the fuel cell stack. Various pressure regulators are known in the art to provide this function, including mechanical pressure regulators and electronic pressure regulators.

Most fuel cell systems employ one or more injectors for injecting the reduced pressure hydrogen gas into the anode side of the fuel cell stack. The injectors are typically controlled by a pulse width modulation (PWM) signal having a certain duty cycle and frequency that provides the desired mass flow of the hydrogen gas for a commanded stack current density. In one known fuel cell system control, the duty cycle and frequency of the injector is set based on the pressure within an anode sub-system.

For example, the pressure regulator may reduce the pressure of the hydrogen gas from a tank pressure of up to 875 Mpa down to approximately 800 kpa to provide a constant supply pressure to the injector. The injector then provides a pulsed flow to regulate the stack anode pressure in a range between 100 and 300 kpa. In maintaining the anode pressure, the hydrogen flow needed to power the fuel cell system is satisfied. It is important to note that both the regulator and the injector are needed to maintain an accurate pressure control over the full range of power transients for vehicle operation. The injector frequency and pulse width are controlled by feedback from an anode pressure sensor. In addition, the injector when open, may provide a high velocity flow to an ejector that recycles gas flow from the stack outlet to the stack inlet. This pulsed operation in conjunction with the recycled flow is crucial to maintain durable and stable system operation.

Over the life of a vehicle, an injector will undergo hundreds of millions of cycles of operation. During this time, there is a potential for the injector to stick open, which can cause an uncontrolled anode pressure rise. The pressure rise must be detected and mitigated before the burst pressure of the stack or other system components is reached, which can damage the system and release hydrogen gas to the environment. An anode pressure sensor is provided downstream of the injector, where if the sensor detects a rise in the anode pressure, the system identifies a failed injector in the open position. Opening the anode valves is not used for this mitigation because the valve flow cannot match the injector flow and also because the hydrogen flow through the valve can lead to unsafe exhaust emissions. As a result, the typically failure strategy has been to shut the system down once a maximum anode pressure is exceeded. However, this may strand the vehicle driver and potentially put the driver in an unsafe traffic situation, which is obviously an undesirable condition depending on where the vehicle is at a particular point in time.

SUMMARY OF THE INVENTION

In accordance with the teachings of the present invention, a system and method are disclosed for controlling hydrogen gas flow to an anode side of a fuel cell stack using a pressure regulator in the event that an injector that normally injects the hydrogen gas into the fuel cell stack has failed in a stuck open position. During normal operation, the opening and closing of the injector is determined based on an anode pressure of an anode sub-system and the position of the pressure regulator is determined based on a supply pressure between the pressure regulator and the injector. If it is determined that the injector is stuck in an open position, then the position of the pressure regulator is controlled to the anode pressure instead of the supply pressure. If the pressure regulator is an electrical pressure regulator, then it is pulsed to mimic normal system operation. Alternately, another valve, such as a shut-off valve, can be employed to provide the flow pulsing.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling a hydrogen gas flow to an anode side of a fuel cell stack using a pressure regulator is merely exemplary in nature, and is in no way intended to limit the invention or its applications or uses. For example, the present invention has particular application for providing hydrogen gas to a fuel cell stack on a vehicle. However, as will be appreciated by those skilled in the art, the system and method of the invention may have application for controlling hydrogen gas flow to other systems and for other applications.

Figure 1:
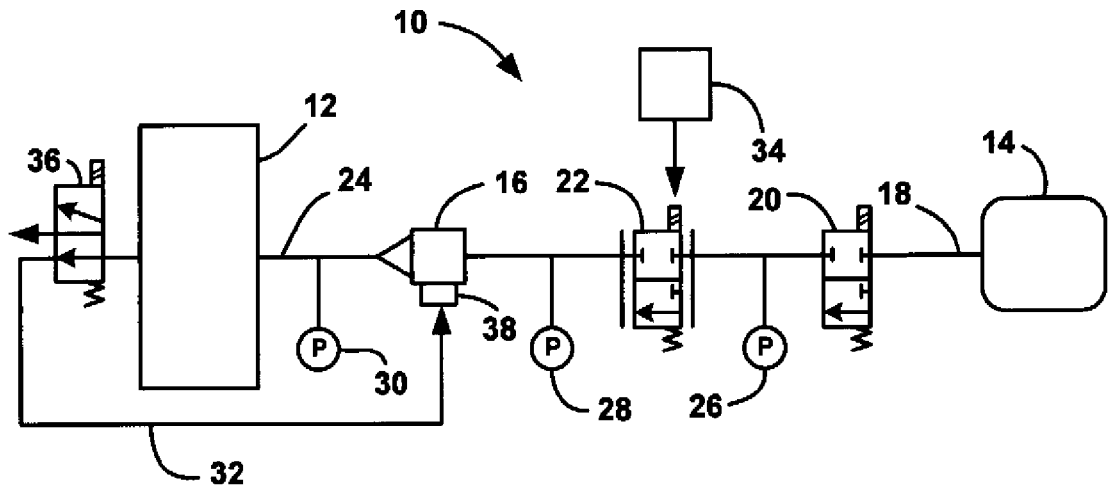
FIG. 1 is a schematic block diagram of a portion of a fuel cell system showing a flow of hydrogen gas from a high pressure tank to a fuel cell stack.

FIG. 1 is a simplified schematic block diagram of a fuel cell system 10 including a fuel cell stack 12. The system 10 includes a high pressure tank 14, which may contain hydrogen gas at a pressure upwards of 700 bar. The tank 14 can be any high pressure tank suitable for the purposes discussed herein, such as the high pressure vessel discussed above having an inner plastic gas tight liner layer and an outer structural composite layer. The high pressure tank 14 includes a tank shut-off valve 20 provided in an output line 18 from the tank 14 for safety purposes. The tank output line 18 is coupled to an anode input line 24 that provides the hydrogen gas stored in the tank 14 to the fuel cell stack 12. A tank pressure sensor 26 is provided in the line 24 to provide a high pressure reading of the pressure within the tank 14 when the valve 20 is open for system control purposes.

A pressure regulator 22 is provided in the input line 24 downstream from the pressure sensor 26 that selectively reduces and provides a constant pressure of the gas from the high pressure of the tank 14 to a pressure suitable for the fuel cell stack 12, in a manner that is well understood by those skilled in the art. The size of the orifice in the regulator 22 and the pressure upstream in the anode line 24 controls the flow rate and the amount of gas that is provided downstream of the pressure regulator 22. The pressure regulator 22 can be any pressure regulator suitable for the purposes discussed herein. In one non-limiting embodiment, the pressure regulator 22 is an electrical pressure regulator operating as a proportional valve having an adjustable orifice. As is well understood by those skilled in the art, the size of the orifice in the regulator 22 and the pressure upstream in the anode line 24 controls the flow rate and the amount of gas that is provided downstream of the pressure regulator 22. A supply pressure sensor 28 measures the pressure in the line 24 downstream of the pressure regulator 22 to provide a supply pressure reading. A controller 34 uses the supply pressure from the pressure sensor 28 to control the position of the orifice in the pressure regulator 22 for the desired supply pressure. The controller 34 receives the pressure measurements from the pressure sensors 26 and 28 and the PWM signal that controls the opening and closing of the injector 16, and controls the position of the pressure regulator 22 so that the pressure remains substantially constant during normal system operation.

The reduced pressure hydrogen gas in the input line 24 downstream of the pressure regulator 22 is injected into the anode side of the fuel cell stack 12 by an injector 16 in a pulsed manner. A pressure sensor 30 is provided in the line 24 downstream of the injector 16 and provides an anode sub-system pressure. The pressure sensor 30 can be provided at any suitable location in the anode sub-system and other embodiments. The injector 16 is controlled by a PWM signal to provide the proper amount of hydrogen gas to the fuel cell stack 12 for a particular stack current density, where the PWM signal has a defined duty cycle and frequency based on the anode pressure provided by the pressure sensor 30. Although a single injector is shown in this non-limiting embodiment to inject the hydrogen gas into the stack 12, those skilled in the art will understand that a fuel cell system may include a bank of several injectors that inject the hydrogen gas into the stack 12.

An anode recirculation line 32 recirculates the anode exhaust gas from the fuel cell stack 12 back to the injector 16. In this non-limiting embodiment, the injector 16 also includes an ejector 38 so that the combination of the injector 16 and the ejector 38 operates as an injector/ejector where the motive force of the hydrogen gas flowing through the injector 16 draws the anode exhaust gas into the injector 16 from the line 32 in a manner well understood by those skilled in the art. A bleed valve 36 is provided in the recirculation line 32 to bleed nitrogen from the anode side of the fuel cell stack 12 in a manner that is also well understood by those skilled in the art. Although the system 10 employs anode recirculation provided by the ejector 38, other systems may employ anode flow-shifting systems or anode recirculation system provided by a recirculation pump.

As will be discussed in detail below, the present invention proposes a technique for allowing the fuel cell system 10 to maintain operation in the event that the injector 16 is stuck in an open position. As discussed above, the duty cycle and the frequency of the injector 16 is controlled to the anode pressure provided by the sensor 30 to provide the desired gas flow. When the injector 16 is determined to be stuck open, generally determined by an increase in pressure sensed by the pressure sensor 30, the controller 34 then controls the pressure regulator 22 based on the anode pressure provided by the sensor 30 instead of the supply pressure provided by the sensor 38. As mentioned, the pressure regulator 22 includes a controllable orifice where the position of the orifice is set based on that pressure set-point.

It is important that the anode pressure be kept above the cathode operational pressure and below the maximum allowable anode operating pressure. In order to achieve this, the maximum stack power and/or maximum power transients should be limited to the dynamic flow response of the regulator 22. In addition, the estimated hydrogen gas flow for the operating condition and pressure set-point changes are used to provide a feed-forward control for the regulator 22.

As mentioned, a pulsed recycle flow is needed to maintain a stable operation based on the operation of the ejector 38. Therefore, in order to keep operating for a sustained time, the regulator 22 will need to provide a pulsed flow. This can be achieved by periodically changing the anode pressure set-point, which limits changes to the response to the regulator 22. The pulsed operation is intended to mimic the operation of the ejector 38, where if a gas recirculation pump were provided instead of the ejector 38, the pulse flow possibly would not be needed. In an alternate embodiment, instead of using the regulator 22 to provide the pulsed flow, it may be possible to use the shut-off valve 20 to provide the pulse flow. For those embodiments where the regulator 22 is a mechanical regulator and is unable to provide the pulsed flow, then the additional valve would be necessary to provide the pulsed flow if it was necessary for system operation. Thus, different embodiments within the scope of the invention may only require a steady flow of hydrogen gas through the pressure regulator 22 based on the anode pressure or may require a pulsed flow of the hydrogen provided by the regulator 23 or another valve.

An additional consideration for continued stable operation is to allow the anode to continue the periodic bleed of anode gas to prevent the nitrogen build-up in the anode side of the fuel cell stack 12. This requires a periodic opening of the bleed valve 36. The estimated valve flow is included in the feed-forward control of the regulator 22, which will minimize dynamically pressure swings when the regulator 22 opens and closes. During this failure, the controller 34 will periodically actuate the injector 16 in an attempt to get the injector 16 to operate properly. This actuation can include alternating the current wave form to the injector 16, such as magnitude, duration and or plurality, such that the component failure is remedied for all or a portion of the operating range.

Figure 2:
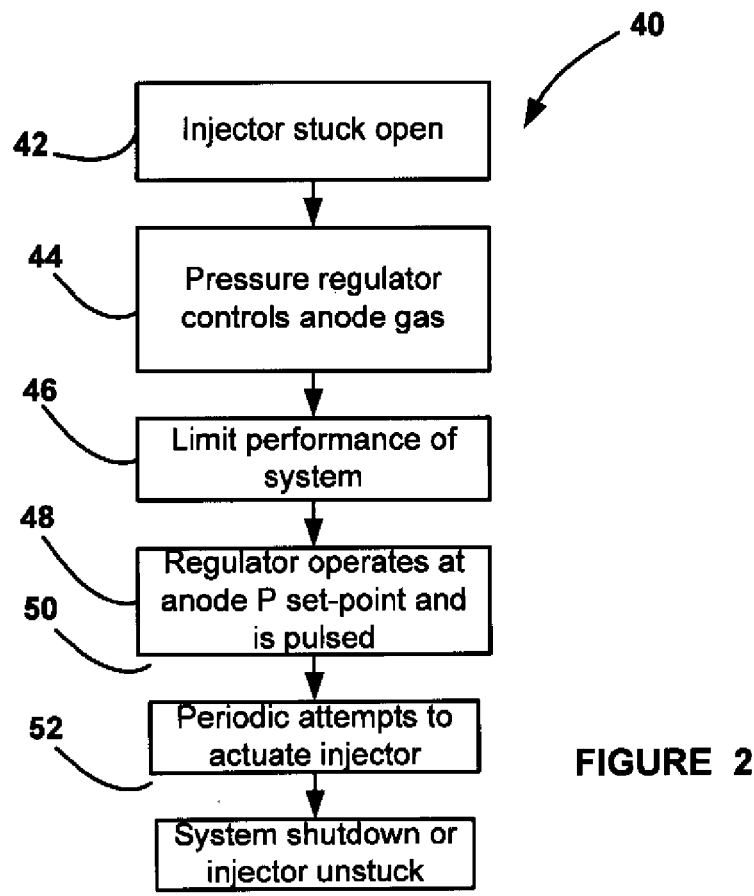
FIG. 2 is a flow chart diagram showing a method for controlling hydrogen gas flow to a fuel cell stack using a pressure regulator.

FIG. 2 is a flow chart diagram 40 showing the operation discussed above for controlling the anode hydrogen gas flow using the pressure regulator 22 if it is determined that the injector 16 is stuck in an open position. At box 42, the algorithm determines that the injector 16 is stuck open by determining that the anode pressure provided by the pressure sensor 30 has reached a predetermined maximum pressure. The algorithm then turns the control of the anode gas flow over to the pressure regulator 22 at box 44 by controlling the position of the pressure regulator 22 to the desired set-point of the anode pressure instead of using the supply pressure provided by the pressure sensor 28. At box 46, the algorithm limits the performance of the system 10 including the maximum power and/or power transients, as discussed above. This allows the pressure regulator 22 to more effectively regulate the anode gas flow based on the anode supply pressure. At box 48, the regulator 22 is operating to the anode pressure set-point, and is pulsed in response thereto to provide the operation of the ejector 38. At box 50, the controller 34 periodically attempts to actuate the injector 16 by providing more current to the injector 16 that is normally used to get it to become unstuck. If the injector 16 does become unstuck, then the system 10 returns to normal operation, where the injector 16 is controlled to the anode pressure. The operation of using the pressure regulator 22 to control the hydrogen gas flow is continued until the system is shut down or the injector 16 becomes unstuck at box 52.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling a flow of hydrogen gas from a hydrogen gas source to an anode side of a fuel cell stack, said method comprising:
reducing pressure of the hydrogen gas from the hydrogen gas source using a pressure regulator based on a supply pressure provided by a supply pressure sensor positioned downstream from the pressure regulator;
injecting the hydrogen gas from the pressure regulator into the anode side of the fuel cell stack using an injector based on an anode pressure provided by an anode pressure sensor positioned downstream of the injector, said supply pressure sensor being upstream of the injector;
determining that the injector is stuck in an open position; and
controlling the flow of the hydrogen gas to the anode side of the fuel cell stack using the pressure regulator based on the anode pressure instead of the supply pressure if the injector is stuck in the open position.

2. The method according to claim 1 wherein controlling the flow of the hydrogen gas includes providing a pulsed flow of the hydrogen gas.

3. The method according to claim 2 wherein the pressure regulator is an electrical pressure regulator and wherein the electrical pressure regulator provides the pulsed flow.

4. The method according to claim 2 wherein controlling the flow of the hydrogen gas to provide the pulsed flow of the hydrogen includes using a shut-off valve positioned upstream of the pressure regulator to provide the pulsed flow of the hydrogen gas.

5. The method according to claim 4 wherein the pressure regulator is a mechanical pressure regulator.

6. The method according to claim 1 further comprising periodically attempting to un-stick the injector if the injector has previously been determined to be in the stuck open position.

7. The method according to claim 6 wherein periodically attempting to un-stick the injector includes applying an increased current flow to the injector.

8. The method according to claim 1 further comprising reducing maximum power of the fuel cell stack and reducing power and rate of transients of the fuel cell stack if the pressure regulator is controlling the flow of hydrogen gas to the anode side of the fuel cell stack.

9. The method according to claim 1 wherein controlling the flow of the hydrogen gas using the pressure regulator includes considering an estimated flow through a bleed valve.

10. A method for controlling a flow of hydrogen gas from a hydrogen gas source to an anode side of a fuel cell stack, said method comprising:

reducing pressure of the hydrogen gas from the hydrogen gas source using an electrical pressure regulator based on a supply pressure provided by a supply pressure sensor positioned downstream from the pressure regulator;

injecting the hydrogen gas from the pressure regulator into the anode side of the fuel cell stack using an injector based on an anode pressure provided by an anode pressure sensor positioned downstream of the injector, said supply pressure sensor being positioned upstream of the injector;

determining that the injector is stuck in an open position based on the anode pressure as provided by the anode pressure sensor has increased above a predetermined pressure value; and controlling the flow of the hydrogen gas to the anode side of the fuel cell stack using the pressure regulator based on the anode pressure instead of the supply pressure if the injector is stuck in the open position, where controlling the flow of the hydrogen gas includes controlling the pressure regulator so that the flow of hydrogen gas through the pressure regulator is a pulsed flow.

11. The method according to claim 10 further comprising periodically attempting to un-stick the injector if the injector has previously been determined to be in the stuck open position.

12. The method according to claim 11 wherein periodically attempting to un-stick the injector includes applying an increased current flow to the injector.

13. The method according to claim 10 further comprising reducing maximum power of the fuel cell stack and reducing power and rate of transients of the fuel cell stack if the pressure regulator is controlling the flow of hydrogen gas to the anode side of the fuel cell stack.

14. The method according to claim 10 wherein controlling the flow of the hydrogen gas using the pressure regulator includes considering an estimated flow through a bleed valve.

* * * * *